Jan. 3, 1956

R. J. KILLIAN ET AL 2,729,110

SHEET METAL PULLEY CONSTRUCTION FOR TOOTH GRIP BELTS

Filed May 7, 1953

INVENTORS
ROBERT J. KILLIAN
ARTHUR M. WICKWIRE
BY PAUL WILLIAMS

*Frease & Bishop*

ATTYS.

Jan. 3, 1956   R. J. KILLIAN ET AL   2,729,110
SHEET METAL PULLEY CONSTRUCTION FOR TOOTH GRIP BELTS
Filed May 7, 1953   3 Sheets-Sheet 2

INVENTORS
ROBERT J. KILLIAN
ARTHUR M. WICKWIRE
PAUL WILLIAMS
BY Frease & Bishop
ATTYS.

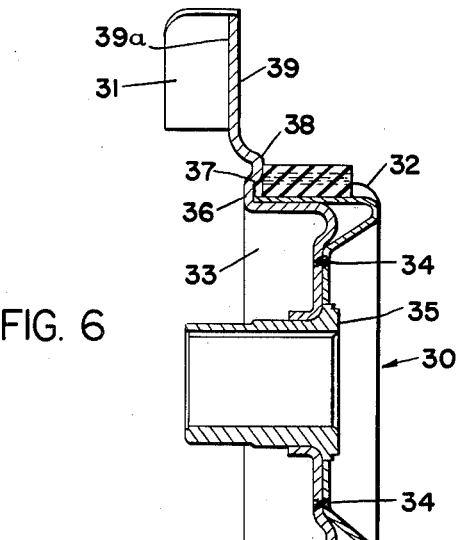
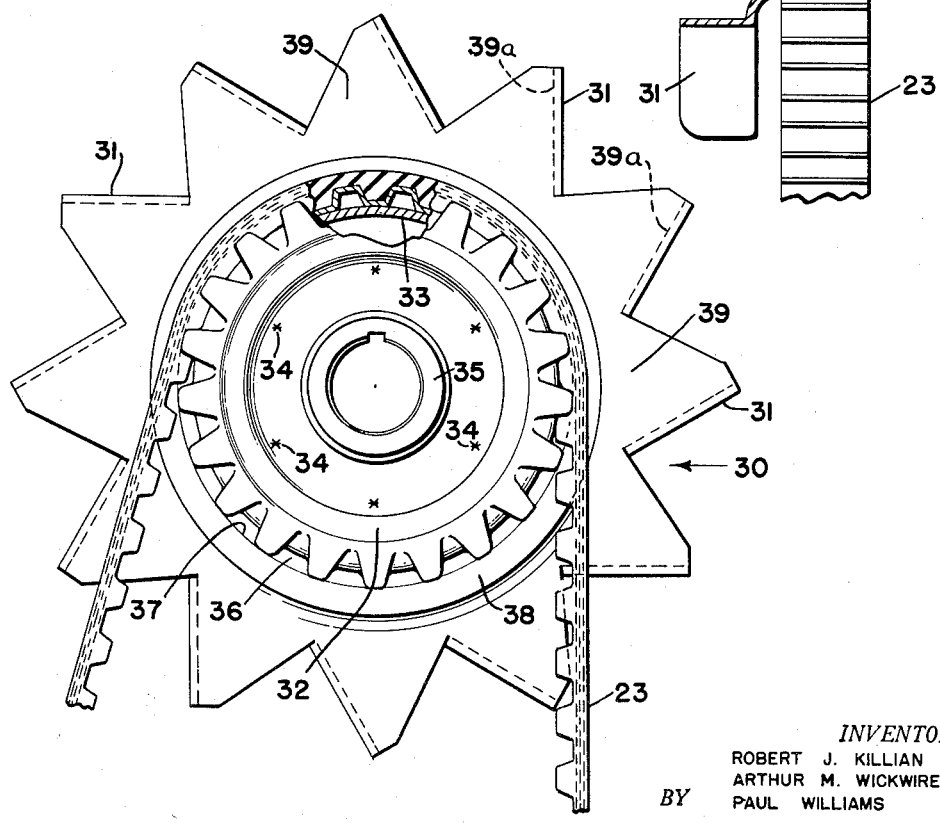

United States Patent Office 2,729,110
Patented Jan. 3, 1956

2,729,110

SHEET METAL PULLEY CONSTRUCTION FOR TOOTH GRIP BELTS

Robert J. Killian, Canton, and Paul Williams, North Canton, Ohio, and Arthur M. Wickwire, Morristown, N. J., assignors to Automatic Steel Products, Inc., Wilmington, Del., a corporation of Delaware Application May 7, 1953, Serial No. 353,588

6 Claims. (Cl. 74—230.8)

The invention relates to belt pulleys and has particular significance in connection with a pulley which has teeth adapting it for use with a tooth grip belt.

The transmission of power by belts is desirable for many applications because belt drives may be operated with less noise, and with less vibratory movement transmittal as compared with chain or gear and sprocket drives. Some primary handicaps of ordinary belt drives have been overcome in the past by providing tooth grip belts and belt pulleys having complementary teeth. Such tooth grip belt drives have a number of advantages. The drive will not slip or creep, initial belt tension is unnecessary, and the belt by including longitudinally extending strain resisting elements will not stretch.

By the elimination of creep, slippage and stretching, there are no speed variations in transmitting power, no power waste, and no back-lash; and there is no necessity to adjust the belt drive for compnsating for such prior difficulties. Furthermore, since the drive is transmitted through teeth of a flexible belt which engage teeth on the belt pulley, no lubrication is necessary. Such belt drive constructions thus provide for precision power transmission and are particularly adapted to timing drives for internal combustion engines since the driving and driven pulleys of such a system may be synchronized perfectly without speed variation and with constant angular velocity.

The preferred form of belt for a tooth grip belt drive includes an endless generally flat belt with tooth formations projecting from the inner face of the belt, said tooth formations engaging circumferentially arranged teeth on the tooth pulleys of the drive. A further requirement of a tooth grip belt drive is the provision of side guide means or flanges on the pulleys to engage the side edges of the belt to hold the belt teeth in engagement with the pulley teeth and to prevent the belt from tracking off from any pulley in the drive construction.

Actually, since a belt is always used with two or more pulleys, it is only necessary to provide one side flange upon each pulley because the flange on one pulley may be used to prevent axial belt movement in one direction and the flange on another pulley used to prevent axial movement in the opposite direction. Still, there has, in the past, existed quite a problem in connection with manufacture or fabrication of tooth pulleys provided with side flanges. For a rotating member of this type, which should be both statically and dynamically balanced, casting does not provide sufficient accuracy of the part without final machining.

The machining of cast pulleys by usual gear cutting methods to provide accurately formed teeth extending transversely across the face of the pulley at least up to one or more side flanges is too expensive and such cast and machined pulleys are relatively heavy.

The manufacture of tooth pulleys from sheet metal, preferably sheet steel, by drawing or pressing operations should eliminate the weight and machining expense difficulties encountered with cast pulleys, but difficulties have been encountered in accurately forming teeth with proper tooth form in an annular flange of a drawn cup formed from a sheet metal blank of a gauge thick enough to carry the torque load to be transmitted.

We have attempted to overcome these difficulties by a number of sheet metal pulley structures each one of which has proven unsatisfactory. For example, if the tooth pulley is made of two telescoped cups, one a light gauge support cup and the second joined to the first also formed of light gauge metal and with an accurate tooth formation in an annular flange thereof, in use the outer tooth flange of the toothed cup tends to grow due to the belt pull thereon and to pull away from an inner smooth sustaining annular flange of the support cup thus changing the effective size of the pulley. Further, the growth of the outer light gauge toothed shell results in a rattling or drumming or vibration noise during operation of the drive.

Other unsuccessful expedients have included attempts to roll the teeth in flat strips and to then attach the strip to a side flanged cup by welding or brazing. This has not been satisfactory because tooth form changes occur when the strip is attached to the cup, so that a multitude of tooth formed strips must be made to take care of various sized pulleys. In another construction, a smooth cup blank was provided with a side flange and with cutout slots in its annual flange in which the belt teeth were to engage. However, it was found that such slots presented raw edges which cut into the rubber teeth of the drive belt resulting in damage to the belt.

It is an object of the present invention to provide a simple and inexpensive tooth pulley structure for overcoming the above mentioned difficulties. A further object of the present invention is to provide a toothed and side flanged sheet metal belt pulley of simple construction having adequate strength.

A still further object of the present invention is to provide combination belt side guide and stiffening means for a drawn sheet metal part provided with teeth designed to mate with the teeth of a tooth grip belt.

These and other objects and advantages apparent to those skilled in the art from the following description and claims may be obtained, the stated results achieved, and the described difficulties overcome by the devices, constructions, arrangements, combinations, subcombinations, parts and elements which comprise the present invention, the nature of which is set forth in the following general statement, preferred embodiments of which—illustrative of the best mode in which applicants have contemplated applying the principles—are set forth in the following description and shown in the drawings, and which are particularly and distinctly pointed out and set forth in the appended claims forming part hereof.

The nature of the present invention may be stated in general terms as including a cup-shaped shell having teeth formed in the outer periphery of an annular flange thereof, the shell having a disc or hub portion; and a second cup-shaped member telescoped within the shell and having a disc or hub portion secured to the shell hub portion to provide added strength and rigidity. The second shell has flange means extending radially outward beyond the teeth of the first shell to not only provide belt side guide means but also to provide a rigid abutment holding the toothed flange of the toothed shell against expansion or growth.

In accordance with some embodiments of the invention the flange is somewhat Z-shaped in cross section extending axially outward to the outer diameter of the teeth, then laterally annularly over the tooth ends, and then axially outward to provide a belt side guide. With this arrangement an inner diameter of the lateral annular flange portion overlaps and tightly holds the outer diameter of the shell teeth so that, in use, the parts tend to tighten against each other providing support against outward movement of the teeth so that the pitch diameter of the teeth remains constant and no noise develops in operation of the improved belt pulley which also automatically provides belt side guide means.

Preferred embodiments of our improved belt pulley and of improved parts thereof are illustrated by way of example in the accompanying drawings in which:

Fig. 6 shows another form of improved belt pulley applied to an automobile generator and generator fan drive; and Fig. 7 is an end view of the arrangement shown in Fig. 6.

Similar numerals refer to similar parts throughout the several views of the drawings.

Figure 1:
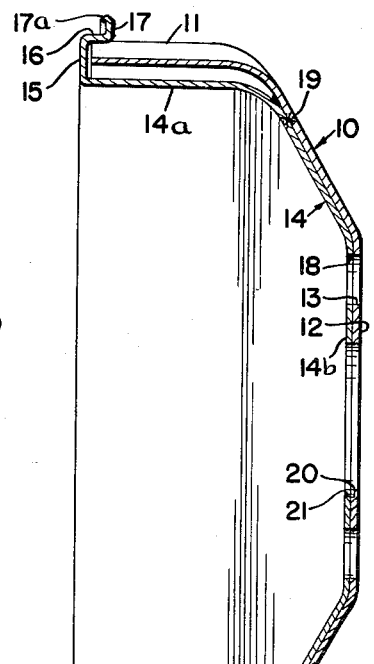
Fig. 1 is a vertical cross sectional view of one form of our improved tooth grip belt pulley.
Figure 2:
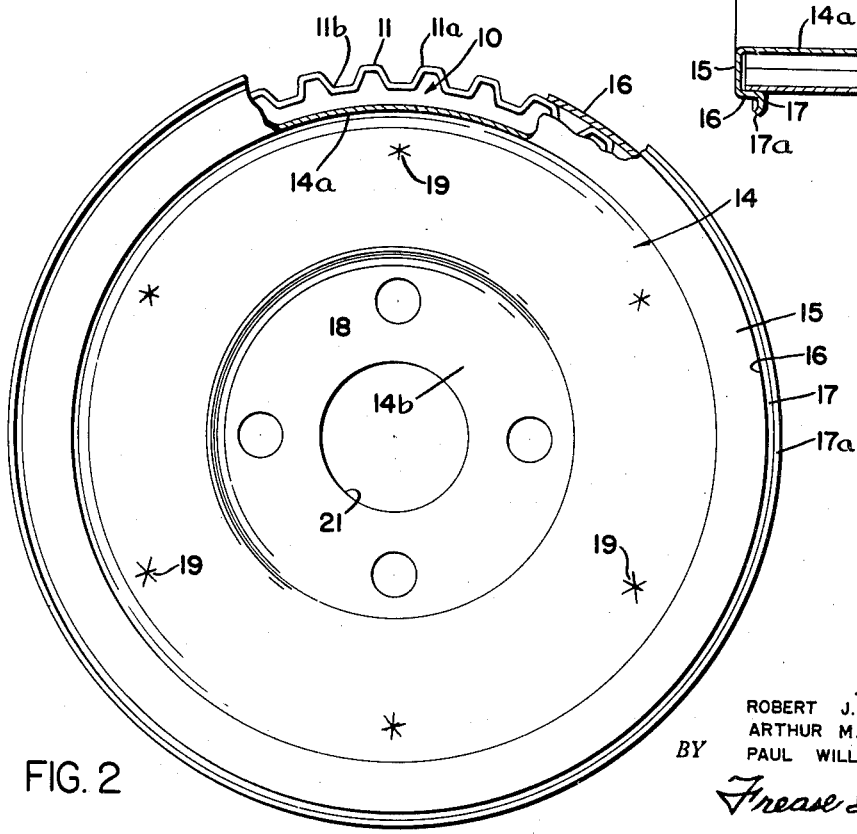
Fig. 2 is an end view, partially broken away, of the pulley shown in Fig. 1.

Referring to Figs. 1 and 2, we have shown a cup-shaped shell or gear cup 10 provided with tooth grip belt engaging teeth 11 and with a hub or disc portion 12 provided with bolt holes 13 for securing to a pulley hub (not shown).

The shell 10 in accordance with the present invention may be drawn from light gauge, say 21 gauge, hot rolled sheet or strip steel. In using light gauge sheet metal, it is possible to draw the tooth formations 11 in the annular side walls of the gear cup 10 to very accurate tooth form or shape, as shown in Fig. 2, and with relatively sharp corners 11a and 11b at the outer and root diameters of the teeth. The disc portion 12 of the shell 10, however, when made of light gauge sheet metal, may not have sufficient strength and rigidity to transmit the torque load carried by the pulley.

Figure 5:
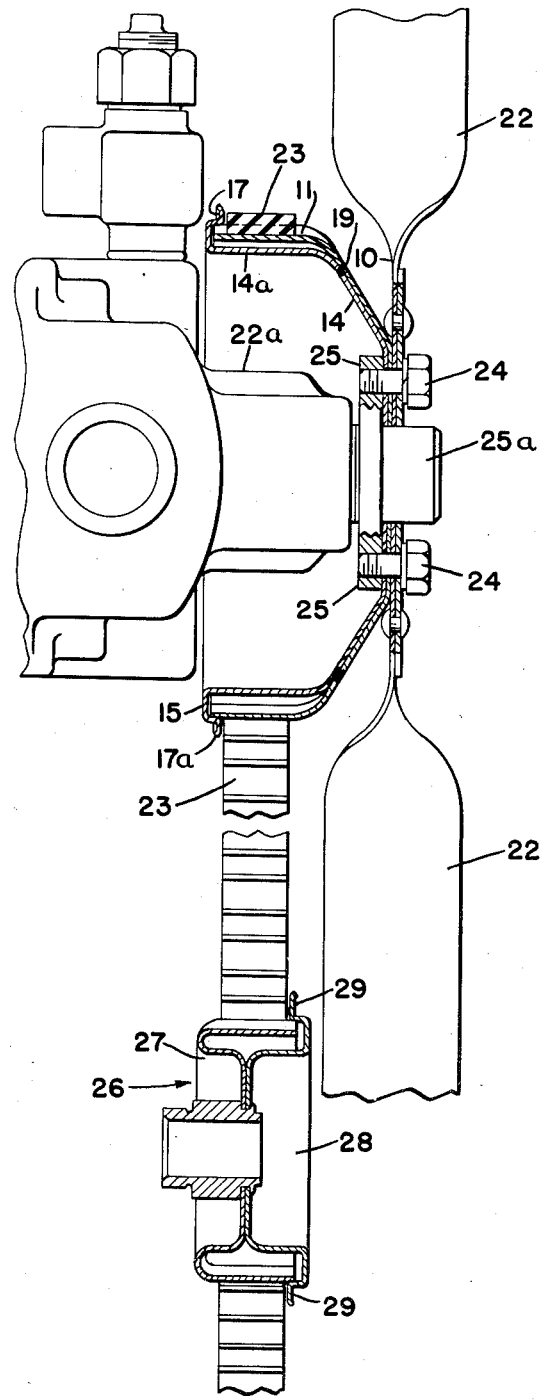
Fig. 5 shows the improved belt pulley of Fig. 1 applied to a fan and water pump drive of an automobile engine.

Accordingly, a second support cup member 14 is provided telescoped or fitting generally within the gear cup or to the shell 10. The support cup 14 has an annular cup side wall portion 14a and a disc portion 14b; and the shells 10 and 14 may be permanently secured together in telescoped relation, as shown in Fig. 1, by a series of spot welds 19. The disc wall 14b of support cup 14 is also provided with a series of bolt holes 18 registering with the holes 13 in gear cup 10; and cup disc portions 12 and 14b are also provided with aligned central apertures 20 and 21 through which a flanged pulley hub for the pulley may extend as shown in Fig. 5. It is desirable in securing the cups 10 and 14 together by spot welding to locate the spot welds 19 as close to the teeth 11 and on as large a diameter as possible to reduce the bending moment imparted to the welds tending to separate the connection during operation of the pulley.

The support cup 14 is formed at the outer end of the annular cup side wall 14a thereof with an outwardly extending radial flange portion 15 which terminates outwardly in a laterally extending annular flange portion 16, which in turn terminates in an outturned radially extending flange portion 17 terminating in a slightly angled circumferential portion or bead 17a.

When the cup members 10 and 14 are assembled and secured together in the telescoped relation shown in Fig. 1, the lateral annular flange portion 16 of support cup 14 engages the outer ends of the teeth 11 at the outer diameter of the teeth, securely supporting and holding the tooth formation 11 against radial growth or expansion when the pulley is operating as part of a tooth grip belt drive. At the same time, the flange portion 17 serves as a belt side guide, to be later described.

As indicated, any tendency of the tooth formation 11 of the gear cup 10 to grow, incident to the pull of the belt thereon, tends to tighten the tooth formation 11 against flange portion 16 and to hold the parts rigidly in the predetermined desired shape with a predetermined or fixed tooth pitch diameter. Furthermore, the fixed and supported telescopic engagement of the tooth formation 11 within the support flange portion 16 holds the cup members 10 and 14 against relative vibration so that the pulley is quiet in use.

Finally, notwithstanding that the cup members 10 and 14 are made of relatively light gauge sheet metal with a substantial overhang of the teeth from the hub opening 20—21, sufficient rigidity and strength are provided by the double walled disc portion 12—14b of the pulley to transmit the torque load carried by the pulley.

Also, although normally the gear cup 10 and support cup 14 are preferably made from the same gauge sheet metal, if the design of the drive requires a heavier pulley or a greater overhang, the necessary strength can be developed by making the support cup 14 of heavier gauge material and the lighter gauge material may be retained for the gear cup 10 so as to enable as sharp a tooth form as possible to be provided.

Figure 3:
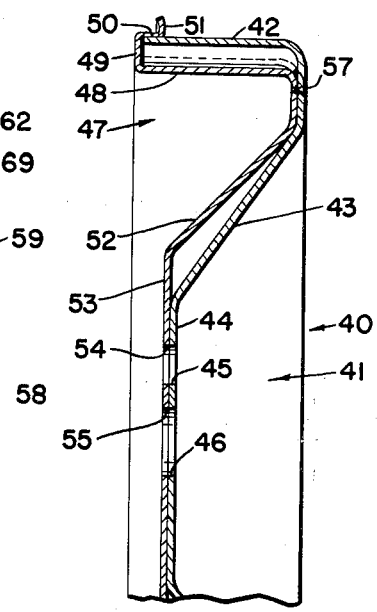
Fig. 3 is a fragmentary vertical section of a modification.

The modified form of pulley 40 illustrated in Fig. 3 contains all of the structural features and advantages of the pulley shown in Figs. 1 and 2 but locates the hub disc portion of the pulley within the confines of the axial length of the teeth rather than with an overhand as in Figs. 1 and 2. The pulley 40 includes a gear cup 41 having a tooth formation 42 drawn in the annular side wall thereof, and is provided with an angular wall 43 and a disc wall portion 44 formed with bolt holes 45 and a central axial hub or shaft receiving opening 46. The support cup 47 which telescopically receives the gear cup 41 includes an annular wall 48 terminating in an outward radially extending flange portion 49, terminating in a lateral annular flange portion 50 which in turn terminates in an outward radially extending guide flange portion 51.

The support cup 47 also is formed with an angular wall portion 52 and a disc wall portion 53 having bolt holes 54 and a central opening 55 registering, respectively, with the openings 45 and 46. The two cup members 41 and 47 may be fixedly secured together by spot welds as indicated at 57.

In assembling and securing the cup members 41 and 47 together as by spot welding, the clearance between the wall portions 43 and 52 permits the two cups to be accurately centered; and the flange formations 49, 50 and 51 of support cup 47 holds the tooth formation 42 to accurately predetermined tooth pitch diameter.

Figure 4:
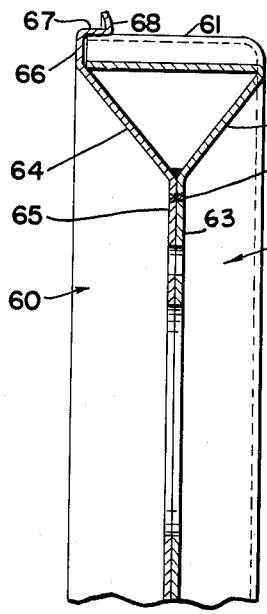
Fig. 4 is a fragmentary vertical section of another modification.

In the modification shown in Fig. 4, the pulley 58 comprises a gear cup 59 and a support cup 60, the gear cup 59 having an annular tooth formation 61, an angled wall portion 62 and a disc wall portion 63; and the support cup 60 having an angular wall portion 64, a disc wall portion 65 and flange portions 66, 67 and 68 holding the tooth formation 61 to fixed predetermined tooth pitch diameter, the cups being spot welded together as at 69.

In Fig. 5 the improved pulley of Fig. 1 is shown incorporated in a tooth grip belt drive of an automobile engine having a radiator (not shown), a radiator cooling fan 22, a water pump 22a, and a flexible rubber toothed driving belt 23. The pulley including gear cup 10 and support cup 14 is secured to the fan blades 22 by bolts 24 which also connect it with a hub flange 25 on shaft 25a of the water pump 22a. The belt 23 may be of the endless transmission type made of rubber or rubber-like material provided with teeth and with longitudinal wire reinforcing as described in Case Patent 2,507,852.

In accordance with conventional practice, the belt 23 may engage pulleys connected with the water pump 22a, the crank shaft and other accessories. In Fig. 5, a pulley for an accessory is indicated at 26 including gear cup 27 and support cup 28 constructed in accordance with the invention and including a radial flange portion 29 forming a guide flange for one edge of belt 23 the other edge of which is guided by flange portion 17 on the water pump pulley.

Another modified form of construction is illustrated in Figs. 6 and 7 in which a pulley generally indicated at 30 is provided with fan blades 31 for use as a pulley on the shaft of a generator which may be driven as an accessory in a belt drive of an internal combustion engine, the fan blades providing a fan for cooling the generator. The pulley 30 is constructed essentially the same as the pulleys shown in Figs. 1 through 5 and includes a gear cup 32 and a support cup 33 tack welded together as at 34, and permanently assembled with hub 35 preferably by brazing. The support cup 33 is formed with flanges 36, 37 and 38 similar to the flanges 15, 16 and 17 in Fig. 1, and the flange 38 may terminate in an outwardly extending disc portion 39 in which the fan blades 31 are formed by slitting and bending outer portions of the disc portion 39 on lines 39a.

Thus in the various embodiments of the improved sheet metal pulley construction described, a toothed pulley is provided composed of two cup members one of which is formed of metal of sufficiently light enough gauge that a proper, accurate and sharp tooth form can be drawn in an annular wall thereof, and the other of which is provided with a lateral annular flange engaging the outer ends of the tooth formation to hold the same rigidly to predetermined shape in use, said flange also forming a part of flange means forming side guide means for the driving belt.

Thus our improved tooth belt pulley is characterized by simplicity and by economy of manufacture. Inasmuch as the support cup or member, having the tooth formation engaging flange, can be made of almost any gauge metal, the toothed member can be made of light gauge sheet metal suitable for forming teeth having the sharpest possible tooth form for optimum operation with a tooth grip belt.

While particular embodiments of the invention have been illustrated and described, further modifications and improvements will occur to those skilled in the art. We desire it to be understood, therefore, that the invention is not to be limited to the embodiments shown, and we intend in the appended claims to cover all modifications within the spirit and scope of the invention, and the elements of such claims are intended to include reasonable equivalents.

We claim:

1. In a belt pulley adapted for use with a tooth grip belt, a sheet metal gear cup member having an annular wall, said cup having teeth formed in said annular wall and having a disc wall portion radially connected with said annular wall, a sheet metal support cup member telescopically assembled with said gear cup member and having a disc wall portion secured to said gear cup disc wall portion radially inward from the region of said teeth, said support member having a flanged portion extending radially outward of one end of said teeth and therebeyond to provide side guide means for a tooth grip belt engaged with said teeth, and annular means on the support member externally engaging and holding outer diameter surface portions of said teeth at one end of said gear cup.

2. In a belt pulley having teeth adapted for complementary engagement with teeth of a tooth grip belt, a sheet metal gear cup having an annular wall provided with corrugations forming teeth in said wall, said gear cup having a radially inwardly extending hub attaching portion and having an intermediate portion extending from said corrugations to said hub attaching portion, a sheet metal support cup configured and arranged to fit generally within said gear cup having a hub attaching portion spot welded to said gear cup adjacent said teeth, annular flange means including a laterally extending annular portion and a radially outwardly extending portion formed integrally with said support cup, said flange means laterally extending annular portion surrounding and engaging the tooth ends at one end of said annular wall and holding said teeth to predetermined fixed pitch diameter, and said flange means radially outwardly extending portion providing belt side guide means.

3. In a belt pulley having teeth adapted for complementary engagement with teeth of a tooth grip belt, a gear cup having an annular wall formed with teeth and having a radially inwardly extending hub portion, a support cup fitting generally within said gear cup having wall portions abutting portions of said gear cup, means securing abutting portions of said cups together, said support cup having a laterally extending annular flange surrounding and engaging end portions of said teeth to hold said teeth against outward expansion, and belt side guide flange means formed on said laterally extending flange.

4. In a belt pulley having teeth adapted for complementary engagement with teeth of a tooth grip belt, a drawn sheet metal cup having cup bottom and side walls, there being corrugations forming teeth in the cup side wall and the bottom wall providing hub attaching means, a second drawn sheet metal cup having a bottom wall and annular flange means connected with said bottom wall, means securing said cup bottom walls together at circumferentially spaced points, said flange means including a portion extending radially outward adjacent the ends of the teeth at one end thereof, said radially outward extending portion terminating in a connected laterally annularly extending portion externally engaging end portions of the teeth, and said laterally annularly extending portion terminating in a radially outwardly extending portion forming belt side guide means.

5. In a belt pulley having teeth adapted for complementary engagement with teeth of a tooth grip belt, a gear cup, a support cup, a hub, the gear cup being provided with belt engaging teeth in an outer annular wall thereof and being secured to said hub inwardly of said annular wall, said support cup being secured to said hub inwardly of said annular wall and engaging said teeth externally thereof, said support cup being secured to said gear cup intermediate the teeth and the hub, and said support cup having means extending radially outward of the teeth providing belt side guide means.

6. In a belt pulley having teeth adapted for complementary engagement with teeth of a tooth grip belt, a drawn gear cup provided with corrugations forming peripheral teeth and having an intermediate annular inwardly extending arcuate portion at one end of said teeth, said gear cup also having a radially inwardly extending portion connected with said intermediate portion, a drawn support cup having a radially extending portion abutting said gear cup radially inwardly extending portion and secured thereto, said support cup also having an intermediate portion extending outward from said radially extending portion terminating in flange means externally engaging portions of said teeth at the outer diameter thereof, and belt side guide flange means formed on one of said cups extending outwardly of said teeth.

References Cited in the file of this patent

UNITED STATES PATENTS

| | | |
|---|---|---|
| 387,470 | Weeden | Aug. 7, 1888 |
| 429,407 | Avery | June 3, 1890 |
| 1,372,414 | Ford | Mar. 22, 1921 |
| 1,384,155 | Rossoe | July 12, 1921 |
| 2,092,571 | Cole | Sept. 7, 1937 |
| 2,111,292 | Miller et al. | Mar. 15, 1938 |
| 2,620,675 | Meadows et al. | Dec. 9, 1952 |
| 2,646,689 | Maher | July 28, 1953 |